US009771202B1

(12) United States Patent
Harris

(10) Patent No.: US 9,771,202 B1
(45) Date of Patent: Sep. 26, 2017

(54) REUSABLE MOBILE ELECTRONIC DEVICE MOISTURE REMOVAL POUCH AND METHOD

(71) Applicant: Elliot Harris, Delray Beach, FL (US)

(72) Inventor: Elliot Harris, Delray Beach, FL (US)

( * ) Notice: Subject to any disclaimer, the term of this patent is extended or adjusted under 35 U.S.C. 154(b) by 0 days.

(21) Appl. No.: 15/280,601

(22) Filed: Sep. 29, 2016

(51) Int. Cl.
  *B65D 85/00* (2006.01)
  *B65D 81/26* (2006.01)
  *B65D 33/01* (2006.01)
  *A45C 11/00* (2006.01)
  *A45C 13/10* (2006.01)
  *H04B 1/3888* (2015.01)

(52) U.S. Cl.
  CPC ............ *B65D 81/264* (2013.01); *A45C 11/00* (2013.01); *A45C 13/10* (2013.01); *B65D 33/01* (2013.01); *A45C 2011/002* (2013.01); *A45C 2011/003* (2013.01); *A45C 2013/1015* (2013.01); *H04B 1/3888* (2013.01)

(58) Field of Classification Search
  CPC ............ B65D 81/266; A45C 2011/002; A45C 2013/025; G06F 1/1628
  USPC ................................... 206/38, 204, 205, 320
  See application file for complete search history.

(56) References Cited

U.S. PATENT DOCUMENTS

| | | | | |
|---|---|---|---|---|
| 2,283,867 A | * | 5/1942 | Flosdorf | ............ B65D 77/0406 206/204 |
| 4,619,361 A | * | 10/1986 | Thomas, Jr. | ......... B65D 81/264 206/204 |
| 4,629,064 A | * | 12/1986 | Barner | ................. B65D 81/264 206/204 |
| 4,861,632 A | * | 8/1989 | Caggiano | .................. B32B 7/02 206/204 |
| 4,927,010 A | * | 5/1990 | Kannankeril | ........ B65D 81/264 206/204 |
| 5,316,141 A | * | 5/1994 | Jalomo | ..................... B65D 5/20 206/320 |
| 5,499,713 A | * | 3/1996 | Huffer | .................. H01H 9/0242 206/320 |
| 2012/0138490 A1 | * | 6/2012 | Hollander | .............. A45C 11/00 206/205 |
| 2013/0098783 A1 | * | 4/2013 | Hernandez | ............ F26B 21/083 206/204 |

* cited by examiner

*Primary Examiner* — Luan K Bui
(74) *Attorney, Agent, or Firm* — Mark C. Johnson; Johnson |Dalal

(57) ABSTRACT

A moisture removal pouch is disclosed with a main pouch body including a front panel portion defining at least one permanently sealed front compartment with desiccated silica permanently sealed therein, a rear panel portion opposite the front panel portion and defining at least one permanently sealed rear compartment with desiccated silica permanently sealed therein, the front and rear panel portions permanently sealed together at a bottom edge and side edges so as to define an electronic device receiving cavity and a main pouch body opening sized to receive an electronic device into the electronic device cavity. The pouch also includes an air-permeable inner liner facilitating a moisture removal operational configuration in which the main pouch body opening is closed in a non-airtight sealable manner and includes a pouch cover disposed to selectively cover the main pouch body opening in the non-airtight sealable manner.

19 Claims, 9 Drawing Sheets

100

REUSABLE MOBILE ELECTRONIC DEVICE MOISTURE REMOVAL POUCH AND METHOD

FIELD OF THE INVENTION

The present invention relates generally to moisture removal from electronic devices, and, more particularly, relates to a mobile electronic device moisture removal pouch and method.

BACKGROUND OF THE INVENTION

It is well known that an electronic device exposed to moisture can damage the electronic components within said device. Moisture exposure can be quite costly, as it requires replacement of the electronic device in addition to significant inconvenience for the user as, often, contact information, photographs, text messages, video, and other media stored on the device may not be recoverable. If the data and information is recoverable, it is likely a very expensive and inconvenient process for the user. One study found that 40% of all cell phone insurance claims are the result of water damage. However, most cell phone insurance policies do not cover water damage.

Existing solutions include placing the moisture-filled cell phone into a Ziploc® bag with rice, or silica packets. Although, rice is generally more readily available a typical consumers, it is not very practical because rice does not work as efficiently to draw out moisture as other materials. Further, rice is considered one of the grittiest grains and therefore leaves grain sediment on the phone and within the i/o ports, connectors, and crevices. Therefore, cleaning the cell phone after the process is extremely cumbersome. Most consumers do not have silica packets readily available at their disposal when the emergency situation arises. Accordingly, when the situation arises, the individual's cell phone may not be recoverable by the time the individual orders and receives the silica packets, or attempts to locate a retail establishment that sells silica packets.

Other solutions include plastic, disposable, single-use bags. However, these solutions only provide for a single use and are expensive considering their limited single-use application. They are also a hassle because, after a single use, consumers are required to purchase another single-use bag for another emergency situation, which reduces the likelihood that the bag will be readily available when needed to remove moisture in a subsequent emergency situation.

Patent application Ser. No. 11/999,786, filed by Nicholas Andrew Forker (hereinafter "Forker"), discloses an apparatus and method to remove moisture from a portable electronic device. Forker describes an airtight, sealable container that is divided by an air and moisture permeable barrier into a compartment for a device and a compartment for desiccant silica gel. The silica gel is provided in a separate container and selectively dispensed by the user into the desiccant compartment when desired for use. Unfortunately, the apparatus and method described in Forker has several disadvantages. Due to the disposition of the desiccant compartment adjacent a single side of the device compartment, the removal of fluid from the device is less efficient and therefore requires a longer time period to dry out the device. Further, as described above, it very cumbersome to require consumers to purchase additional desiccant in order to be able to use the apparatus again for subsequent emergency situations. Yet, all know methods and apparatuses for utilizing desiccant to remove moisture from electronic devices requires and teaches acquisition of new, unused desiccant for subsequent occasions that require moisture removal. In fact, Forker expressly states that "desiccant has a finite capacity for absorbing moisture, and once desiccant is saturated with moisture it is usually not practical to recycle it." Accordingly, it is generally known in the desiccant drying arts to avoid re-using desiccant material that has already been used to absorb moisture. Therefore, existing solutions direct consumers to dispose of used desiccant material and acquire new, unused desiccant for subsequent drying occasions. This is a disadvantage of using desiccant to remove moisture from electronic devices. In particular, it is cumbersome and greatly reduces the likelihood that the desiccant material will be readily available when needed to remove moisture in subsequent emergency situations.

Existing solutions also require an airtight sealed container. Forker teaches as much by explaining that an airtight seal "ensures that the desiccant absorbs only water from the portable electronic device, and not from the general environment." That being said, fasteners for sealing containers in an airtight manner are more complex and expensive to manufacture and design. Other known devices used to remove moisture from electronic devices involve relatively complex and expensive devices typically requiring the use of a vacuum pump.

Therefore, a need exists to overcome the problems with the prior art as discussed above.

SUMMARY OF THE INVENTION

The invention provides a mobile electronic device moisture removal pouch and method that overcomes the hereinafore-mentioned disadvantages of the heretofore-known devices and methods of this general type.

With the foregoing and other objects in view, there is provided, in accordance with the invention, a moisture removal pouch that includes a main pouch body with a front panel portion with at least one front compartment embedded within the front panel portion and with desiccated silica permanently sealed within the at least one front compartment on all sides thereof. The main body also includes a rear panel portion with at least one rear compartment embedded within the rear panel portion and with desiccated silica permanently sealed within the at least one rear compartment on all sides thereof, wherein the rear panel portion is disposed opposite the front panel portion and the at least one front compartment is disposed opposite the at least one rear compartment. The main pouch body also includes the front and rear panel portions permanently sealed together at a bottom edge and side edges thereof so as to define an electronic device receiving cavity and a main pouch body opening opposite the bottom edge, wherein the electronic device receiving cavity sized to receive a standard-sized smart phone therein with a snug fit and the main pouch body opening sized to receive the standard-sized smart phone into the electronic device receiving cavity. The pouch also includes a fluid-permeable inner liner lining operably configured to permit a bi-directional flow of moisture from an electronic device disposed within the electronic device receiving cavity, the bi-directional flow of moisture including a first moisture removal channel flowing in a first direction, from the electronic device, through the air-permeable inner liner, to the desiccated silica permanently sealed within the at least one front compartment and simultaneously, a second moisture removal channel flowing in a second direction, opposite the first direction, from the electronic device, through the air-permeable inner liner, to the desiccated silica permanently sealed within the at least one rear compartment. Lastly, the main pouch may also include a moisture removal operational configuration in which the main pouch body opening is closed in a non-airtight sealable manner.

In accordance with another feature, an embodiment of the present invention includes a pouch cover disposed to cover the main pouch body opening in the non-airtight sealable manner in the moisture removal operational configuration.

In accordance with a further feature of the present invention, the pouch cover is formed as a selectively closeable flap and the flap is selectively closeable by a hook-and-loop fastener.

In accordance with another feature of the present invention, the at least one front compartment includes at least two vertically aligned front compartments each with desiccated silica permanently sealed therein and the at least one rear compartment includes at least two vertically aligned compartments each with desiccated silica permanently sealed therein.

In accordance with yet another feature of the present invention, each of the front and rear panel portions are multi-layered with the air-permeable inner liner as an interior layer, a non-permeable material as an exterior layer, and the corresponding desiccated silica as an intermediate layer disposed between the air-permeable inner liner and the non-permeable material.

In accordance with another feature of the present invention, the air-permeable inner liner is of a polyester fabric and the exterior layers of the front and rear panel portions are of a nonwoven fabric. Further, the front and rear panel portions may be stitched together at the side edges and continuous with one another at the bottom edge.

In accordance with the present invention, a moisture removal pouch is disclosed that includes a main pouch body having (1) a front panel portion with at least one front compartment embedded within the front panel portion and with desiccated silica permanently sealed within the at least one front compartment on all sides thereof, (2) a rear panel portion with at least one rear compartment embedded within the rear panel portion and with desiccated silica permanently sealed within the at least one rear compartment on all sides thereof, the rear panel portion disposed opposite the front panel portion and the at least one front compartment disposed opposite the at least one rear compartment, (3) the front and rear panel portions permanently sealed together at a bottom edge and side edges thereof so as to define an electronic device receiving cavity and a main pouch body opening opposite the bottom edge, the main pouch body opening sized to receive an electronic device into the electronic device receiving cavity, (4) an air-permeable inner liner lining the electronic device receiving cavity so as to permit a bi-directional flow of moisture on an electronic device disposed within the electronic device receiving cavity, the bi-directional flow of moisture including a first moisture removal channel flowing in a first direction, from the electronic device, through the air-permeable inner liner, to the desiccated silica permanently sealed within the at least one front compartment and simultaneously, a second moisture removal channel flowing in a second direction, opposite the first direction, from the electronic device, through the air-permeable inner liner, to the desiccated silica permanently sealed within the at least one rear compartment, and a moisture removal operational configuration in which the main pouch body opening is closed in a non-airtight sealable manner.

In accordance with the present invention, a method of removing moisture from an electronic device includes providing a moisture removal pouch with a main pouch body having a front panel portion with at least one front compartment embedded within the front panel portion and with desiccated silica permanently sealed within the at least one front compartment on all sides thereof, a rear panel portion with at least one rear compartment embedded within the rear panel portion and with desiccated silica permanently sealed within the at least one rear compartment on all sides thereof, the rear panel portion opposite the front panel portion, wherein the front and rear panel portions permanently sealed together at a bottom edge and side edges thereof so as to define an electronic device receiving cavity and a main pouch body opening sized to receive an electronic device into the electronic device receiving cavity, and an air-permeable inner liner lining the electronic device receiving cavity, a moisture removal operational configuration in which the main pouch body opening is closed in a non-airtight sealable manner, and a pouch cover disposed to selectively cover the main pouch body opening in the non-airtight sealable manner. The method includes (1) opening the moisture removal pouch by lifting the pouch cover to permit access into the electronic device receiving cavity, (2) after opening, inserting an electronic device through the main pouch body opening into the electronic device receiving cavity, and (3) after inserting, closing the moisture removal pouch in the non-airtight sealable manner by moving the pouch cover over the main pouch body opening.

In accordance with another feature, an embodiment of the present invention includes removing moisture from the electronic device disposed within the electronic device receiving cavity via a bi-directional flow of moisture including a first moisture removal channel flowing in a first direction, from the electronic device, through the air-permeable inner liner, to the desiccated silica permanently sealed within the at least one front compartment and simultaneously, a second moisture removal channel flowing in a second direction, opposite the first direction, from the electronic device, through the air-permeable inner liner, to the desiccated silica permanently sealed within the at least one rear compartment.

In accordance with yet another feature, an embodiment of the present invention also includes fastening the pouch cover to the main pouch body via a hook-and-loop fastener. Further, the method may include, after removing moisture, removing the electronic device from the electronic device receiving cavity and drying the desiccated silica by directing heated air from a hair dryer toward the moisture removal pouch and, after drying the desiccated silica with the hair dryer, reusing the moisture removal pouch to remove moisture from a second electronic device.

Although the invention is illustrated and described herein as embodied in a mobile electronic device moisture removal pouch and method, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the moisture removal pouch from an upper end to a bottom end.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
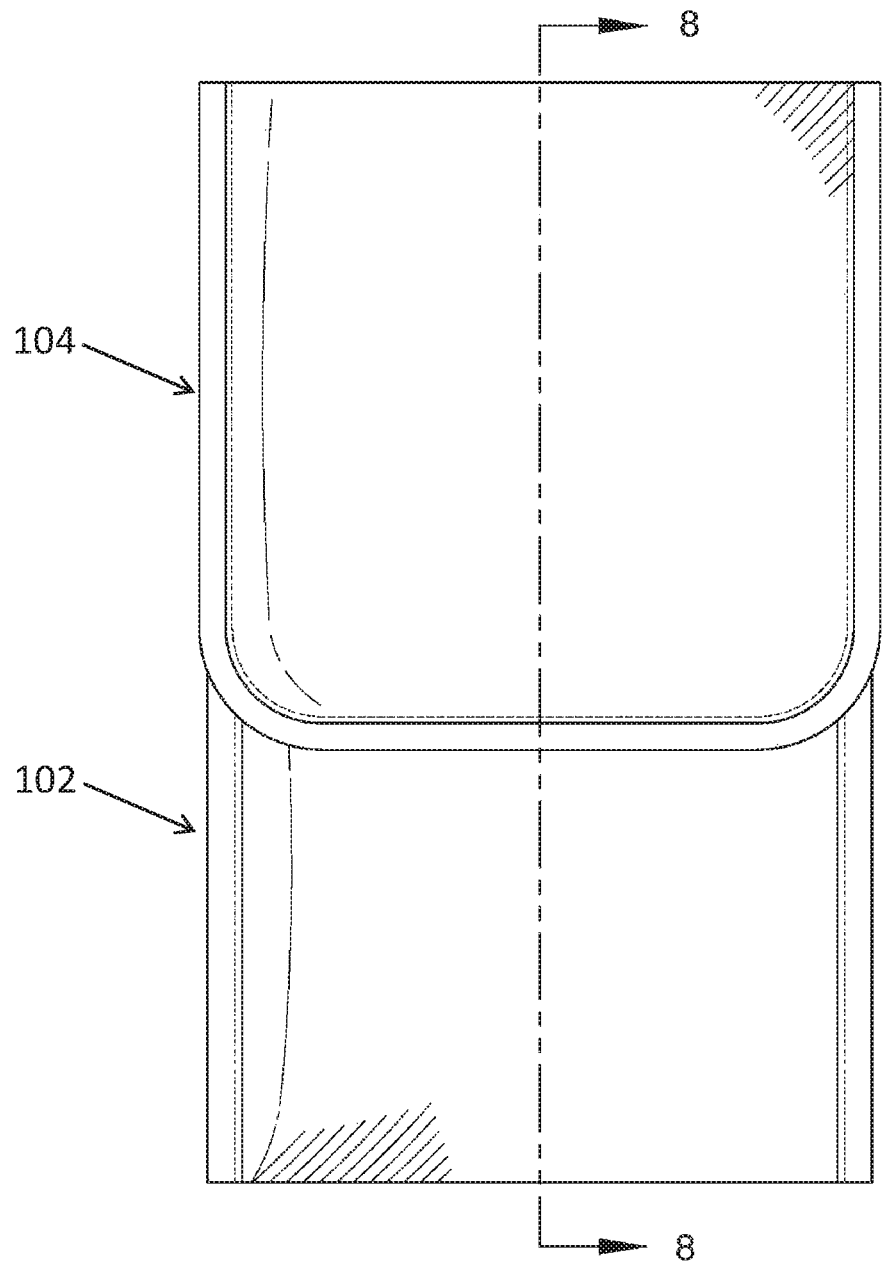
FIG. 1 is a front elevational view of an exemplary embodiment of a moisture removal pouch in accordance with the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient re-usable moisture removal pouch and method of using the same to remove moisture from an electronic device. Embodiments of the invention provide a main pouch body with front and rear panel portions permanently sealed together at bottom and side edges thereof so as to define a pouch cavity and a pouch opening into the pouch cavity, the pouch opening being disposed opposite the bottom edge. In addition, embodiments of the invention provide for desiccated silica compartments embedded into the front and rear panel portions for bi-directional removal of moisture from both sides of the electronic device simultaneously. Some embodiments of the invention provide for the pouch cavity to be sized and shaped so as to provide a snug fit for a standard-sized smart phone so that moisture travels more readily to the desiccated silica compartments embedded into the front and rear panel portions, rather than escaping into the outside environment through the pouch opening.

Further, embodiments of the invention divide the front and rear desiccated silica compartments into respective top and bottom desiccated silica compartments. In an additional embodiment, the pouch cavity is lined with a permeable inner liner and the exterior layer of the main pouch body is of a non-permeable material. In yet a further embodiment, the moisture removal pouch includes a pouch cover that may be folded over the pouch opening so as to selectively cover the pouch opening in a non-airtight manner during a moisture removal operational configuration. Unexpectedly, such an embodiment provides for a convenient, user-friendly method and apparatus for opening and closing the pouch for continued re-usability, while also still effectively and efficiently removing moisture from the electronic device disposed within the pouch cavity.

Referring now to FIGS. 1-4, one embodiment of the present invention is shown in front elevations views, a rear elevational view, and a downward-looking perspective view, respectively. FIGS. 1-4 show several advantageous features of the present invention, but, as will be described below, the invention can be provided in several shapes, sizes, combinations of features and components, and varying numbers and functions of the components. The first example of a moisture removal pouch 100, as shown in FIG. 1, includes a main pouch body 102 and a pouch cover 104.

The main pouch body 102 includes a front panel portion 200 and a rear panel portion 300. As used herein, the term "panel portion" is used broadly to indicate a wall forming a portion of the main pouch body 102 (e.g., front and rear walls of the main pouch body 102) and may also include one or more layers forming the wall/panel portion, as will be described in more detail below with reference to FIG. 8. Further, the "panel portion" may be a portion of a single continuous panel that is folded over and coupled (e.g., stitched) together so as to form the main pouch body 102, and may, in other embodiments, include of a plurality of separate/discontinuous panels (e.g., a pair of separate panels) that are coupled together (e.g., stitched) to form the main pouch body 102.

The front panel portion 200 includes a first front compartment 202. The first front compartment 202 may be embedded within the front panel portion 200 and with desiccated silica 800 (see FIG. 8) permanently sealed therein on all sides 206 of the first front compartment 202. As used herein, the term "permanently sealed" is intended to indicate a joining of at least two things together so as to prevent them from coming apart during normal use (e.g. stitching, a permanent adhesive material, etc.), wherein any coming apart of the at least two things constitutes a destruction of the pouch 100 for its normal, intended operational use.

As used herein, the term "embedded" is intended to indicate that the respective compartment 202 is entirely surrounded and enclosed within the respective panel portion 200 so as be neither accessible nor visible from an external environment. This provides a sleek design that permits the moisture removal pouch 100 to be usable on an everyday basis as an everyday carrying case, which, advantageously, increases the probability that the moisture removal pouch 100 will be immediately available to the user for its intended operational use as a moisture removal apparatus when the emergency situation arises, the emergency situation being that the user's electronic device is exposed to moisture.

In a further embodiment, the front panel portion 200 also includes a second front compartment 204. The second front compartment 204 may also be embedded within the front panel portion 200 and with desiccated silica 802 (see FIG. 8) permanently sealed therein on all sides 208 of the second front compartment 204.

Stated another way, each of the front compartments 202 and 204 may be considered to be permanently sealed along an entire outer perimeter of the sides 206, 208, respectively, thereof, so as to permanently seal the desiccated silica 800 and 802 (see FIG. 8), respectively, therein. In other words, the permanent seal extends continuously along the entire outer perimeter 206 and 208 so as to prevent access into and a removal of desiccated silica 800, 802 (see FIG. 8) from within the compartments 202 and 204. This permanently sealed feature underlies the reusability of the inventive moisture removal pouch 100 of the present invention that distinguishes it from existing moisture removal systems. Unexpectedly, applicants of the present invention have discovered that desiccated silica may be reused to remove moisture from electronic devices on multiple separate occasions, as will be described in more detail herein below with reference to the flow chart depicted in FIG. 9.

Figure 2:
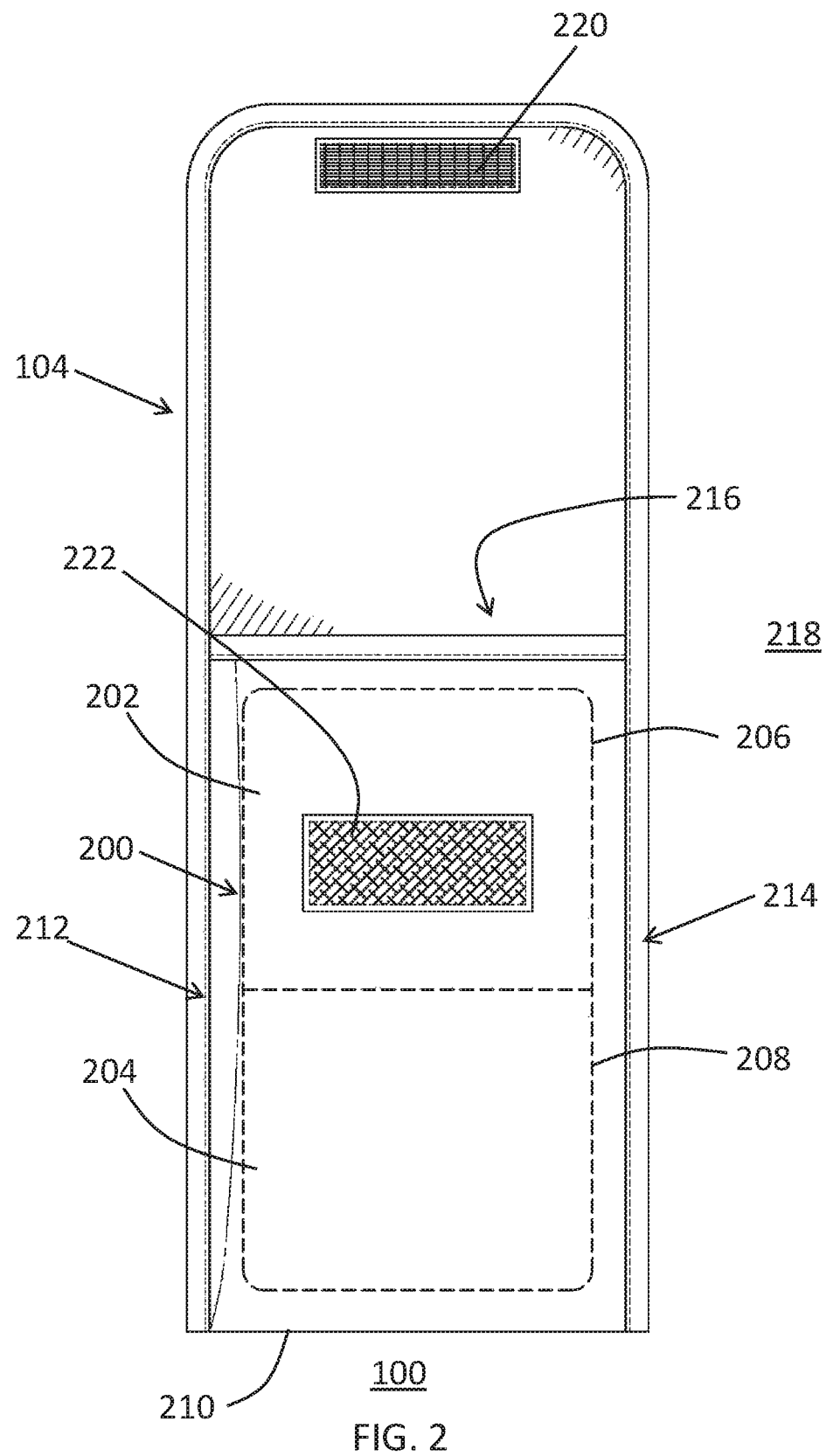
FIG. 2 is a front elevational view of the moisture removal pouch of FIG. 1, shown with a cover opened and hidden lines illustrating the silica front compartments, in accordance with the present invention.

In the exemplary embodiment depicted in FIG. 2, the compartments 202 and 204 are rectangular-shaped each with four sides 206 and 208. In an alternative embodiment, the compartments 202 and 204 may be other shapes, such as a circle, square, or other polygon-shape. Preferably, the compartments 202 and 204 are shaped and sized so as to provide an embedded desiccated silica layer 800 and 802 (see FIG. 8) that extends across a substantial area of the front panel portion 200 so as to efficiently and effectively remove moisture from an electronic device disposed within the pouch 100.

In one embodiment, the first and second front compartments 202 and 204 may be disposed so as to be vertically aligned with one another. In an alternative embodiment, the first and second front compartments 202 and 204 may be disposed so as to be aligned with one another in other configurations relative to one another, such as, for example, a horizontal alignment. Advantageously, by segmenting the desiccated silica 800 and 802 (see FIG. 8) into separate compartments 202 and 204 the desiccated silica may be dried more quickly after one use so that the pouch 100 may be subsequently reused, as will be described in more detail herein below with reference to the flow chart depicted in FIG. 9. In further embodiments, the desiccated silica 800 and 802 (see FIG. 8) may be segmented into more than two front compartments 202 and 204.

In one embodiment, the rear panel portion 300 of the main pouch body 102 may be considered a mirror image of the front panel portion 200 with identical features and layers, except disposed opposite the front panel portion 200.

Accordingly, the rear panel portion 300 may include a first rear compartment 302. The first rear compartment 302 may be embedded within the rear panel portion 300 and with desiccated silica 804 (see FIG. 8) permanently sealed therein on all sides 306 of the first rear compartment 302. Definitions for the "permanently sealed" and "embedded" terminology used herein applies equally to the rear panel portion 300 and the front panel portion 200 (and their elements, layers, and configurations) and will therefore not be repeated in this section for the sake of brevity.

The rear panel portion 300 also includes a second rear compartment 304. The second rear compartment 304 may also be embedded within the rear panel portion 300 and with desiccated silica 804 (see FIG. 8) permanently sealed therein on all sides 308 of the second rear compartment 304.

Stated another way, each of the rear compartments 302 and 304 may be considered to be permanently sealed along an entire outer perimeter 306 and 308, respectively, thereof, so as to permanently seal the desiccated silica 804 and 806 (see FIG. 8), respectively, therein. In other words, the permanent seal extends continuously along the entire outer perimeter 306 and 308 so as to prevent access into and a removal of desiccated silica 804, 806 (see FIG. 8) from within the compartments 302 and 304.

Figure 3:
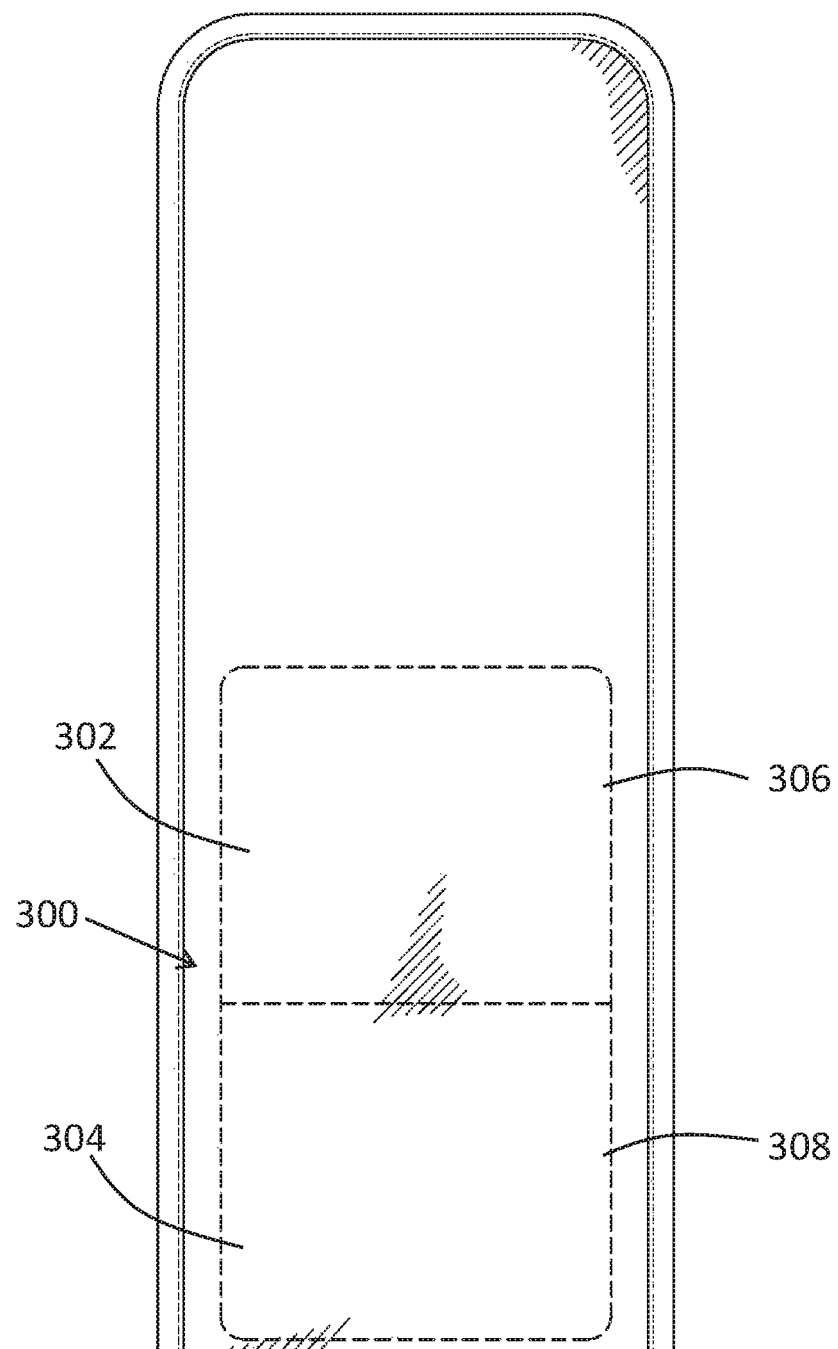
FIG. 3 is a rear elevational view of the moisture removal pouch of FIG. 1, with hidden lines illustrating the silica rear compartments, in accordance with the present invention.

As with the exemplary embodiment depicted in FIG. 2 for the front compartments 202, 204, the rear compartments 302, 304 are formed, in the exemplary embodiment depicted in FIG. 3, as rectangular-shaped each with four sides 306 and 308. However, in an alternative embodiment, the rear compartments 302 and 304 may be formed as other shapes, such as a circle, square, or other polygon-shape. Preferably, the compartments 302 and 304 are shaped and sized so as to provide an embedded desiccated silica layer 804 and 806 (see FIG. 8) that extends across a substantial area of the rear panel portion 300 so as to efficiently and effectively remove moisture from an electronic device disposed within the pouch 100.

In one embodiment, the first and second rear compartments 302 and 304 may be disposed so as to be vertically aligned with one another. In an alternative embodiment, the first and second rear compartments 302 and 304 may be disposed so as to be aligned with one another in other configurations relative to one another, such as, for example, a horizontal alignment. Advantageously, by segmenting the desiccated silica 804 and 806 (see FIG. 8) into separate compartments 302 and 304 the desiccated silica may be dried more quickly after one use so that the pouch 100 may be subsequently reused, as will be described in more detail herein below with reference to the flow chart depicted in FIG. 9. In further embodiments, the desiccated silica 804 and 806 (see FIG. 8) may be segmented into more than two rear compartments 302 and 304. The rear compartments 302 and 304 may be disposed opposite the front compartments 202 and 204. In one embodiment, the compartments 302, 304 and 202, 204 may be formed by stitching compartment panels to an inner liner.

Referring now to FIGS. 2-6, an electronic device receiving cavity 400 defined by the pouch 100 will be described. In one embodiment, the front and rear panel portions 200 and 300 may be permanently sealed together at a bottom edge 210 and side edges 212 and 214 thereof so as to define the electronic device receiving cavity 400 and a main pouch body opening 216. The main pouch body opening 216 may be disposed opposite the bottom edge 210. The side edges 212 and 214 may be considered opposing side edges 212 and 214. The side edges 212 and 214 may be oriented parallel within one another and oriented perpendicular to the bottom edge 210. In one embodiment, the front and rear panel portions 200 and 300 are stitched together at the side edges 212 and 214. In yet another embodiment, the front and real panel portions 200 and 300 are formed as a continuous panel that is stitched together at the side edges 212 and 214 so as to form the front and rear panel portions 200 and 300 and simultaneously folded up so as to be continuous at the bottom edge 210 of the main pouch body 102. In yet other embodiments, the front and rear panel portions 200 and 300, the side edges 212 and 214, and the bottom edge 210 may be provided in other orientations and configurations.

The main pouch body opening 216 may be sized to receive an electronic device 500 into the electronic device receiving cavity 400. In some embodiments, the main pouch body opening 216 may be sized to receive a computer tablet into the electronic device receiving cavity 400. In another embodiment, the main pouch body opening 216 may be sized to receive a laptop into the electronic device receiving cavity 400.

Figure 6:
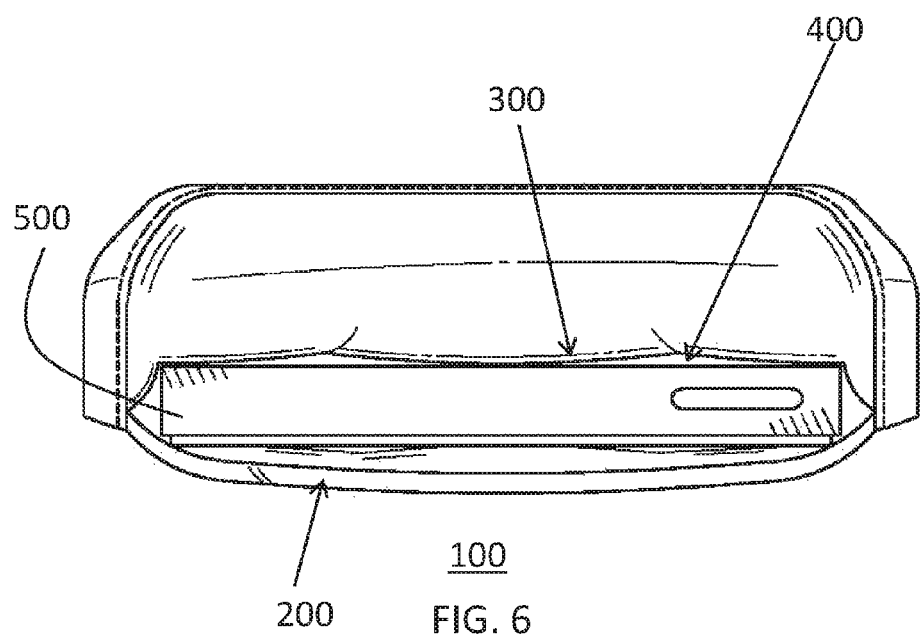
FIG. 6 is a plan view of the moisture removal pouch of FIG. 1, with the cover opened showing the electronic device entirely inserted within the electronic device receiving cavity, in accordance with an exemplary embodiment of the present invention.
Figure 8:
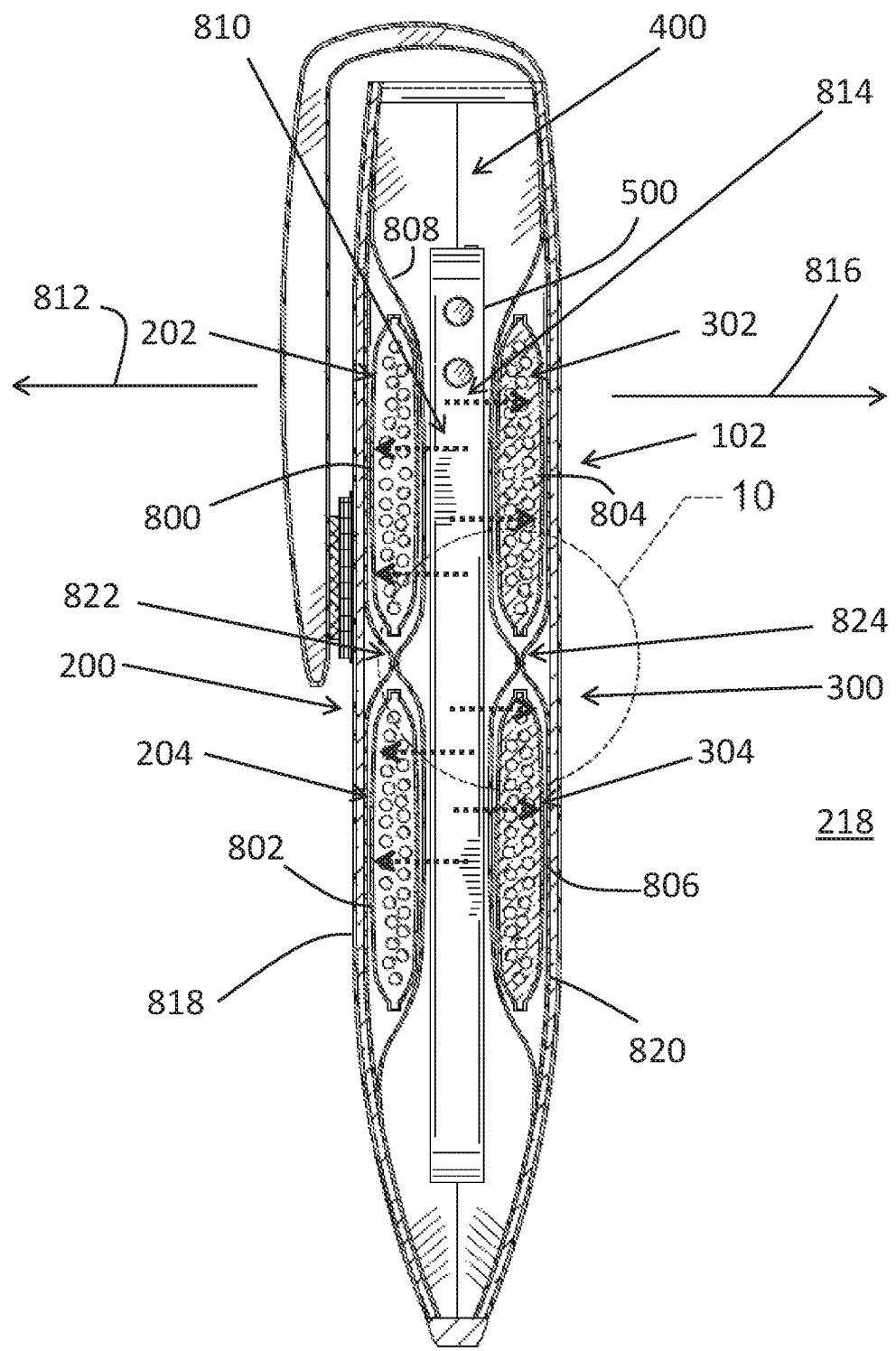
FIG. 8 is a cross-sectional view of the moisture removal pouch of FIG. 1 along section line 8-8, illustrating the external, interior, and intermediate layers of the pouch panel portions, in accordance with an exemplary embodiment of the present invention.

In a preferred embodiment, the main pouch body opening 216 is sized to receive a standard-sized smart phone 500 into the electronic device receiving cavity 400. Standard-sized smart phones have dimension ranges that are about 5-6 inches in length, 3-3.5 inches in width, and 0.3-0.4 inches in thickness. In one embodiment, the electronic device receiving cavity 400 may be sized to receive the standard-sized smart phone 500 therein within a snug fit. As used herein, the term "snug fit" is intended to indicate a tight fit for the standard-sized smart phone 500 when it 500 is disposed within the electronic device receiving cavity 400. Advantageously, the snug fit feature provides more efficient and quick removal of moisture from the electronic device 500 disposed within the snug fit electronic device receiving cavity 400. For example, as can be seen in FIGS. 6 and 8, the electronic device 500 is immediately adjacent to the panel portions 200, 300 (see FIG. 6), and, more particularly, almost immediately adjacent the desiccated silica 800, 802, 804, 806 (see FIG. 8) within the respective compartments, with the exception of one or more relatively thin permeable inner layers disposed between the electronic device 500 and the desiccated silica 800, 802, 804, 806. Also, with the snug fit sizing of the electronic device receiving cavity 400, fluid moisture is less likely to travel into the opening 216 from an external environment 218, undesirably saturating the desiccated silica, which is more preferably reserved for absorbing moisture from the electronic device 500. This is particularly advantageous in embodiments of the present invention because the pouch cover 104 closes the opening 216 in a non-airtight sealable manner, as will be described in more detail herein below.

Figure 7:
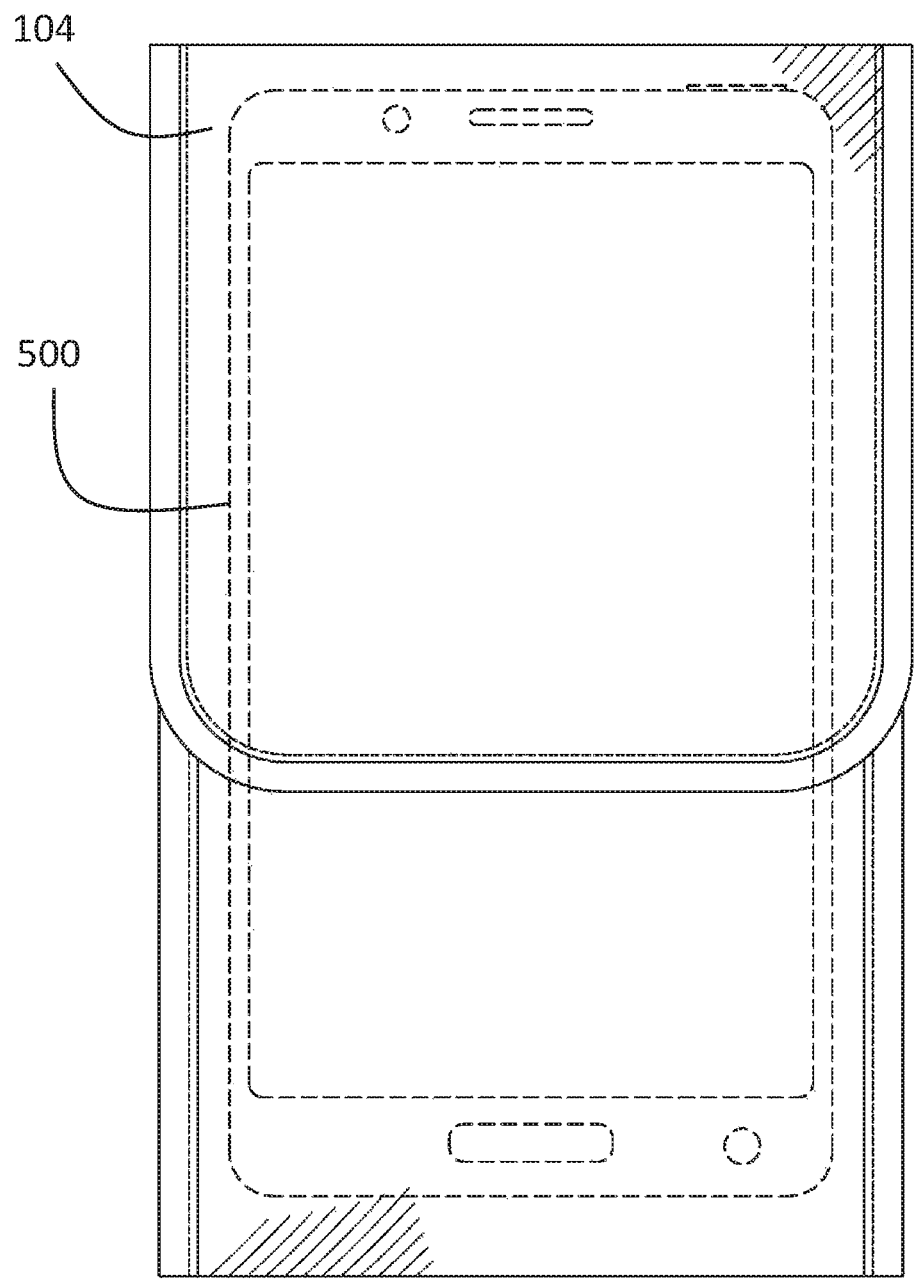
FIG. 7 is an elevational front view of the moisture removal pouch of FIG. 1, illustrating the cover closed with hidden lines showing the electronic device within the electronic device receiving cavity, in accordance with the present invention.

Referring now primarily to FIGS. 2 and 7, the pouch cover 104 will be described. The pouch cover 104 is disposed to cover the main pouch body opening 216. In a preferred embodiment, the pouch cover 104 is disposed to cover the main pouch body opening 216 in a non-airtight sealable manner in the moisture removal operational configuration. The "moisture removal operational configuration" is intended to indicate a configuration of the moisture removal pouch 100 that is intended for removing moisture from the electronic device 500 disposed within the electronic device receiving cavity 400. In other words, the moisture removal operational configuration includes the electronic device 500 disposed within the cavity 400 and the pouch cover 104 covering the main pouch body opening 216. Divergent from existing moisture removal apparatuses and configurations of this type, the moisture removal pouch 100 is provided with a closing mechanism that does not provide for an airtight seal. As can be seen in the exemplary embodiment, the pouch cover 104 is formed as a selectively closeable flap that may be selectively closed by mating hook-and-loop fasteners 220 and 222, which are generally known not to form an airtight seal. In other embodiments, the pouch cover 104 may be selectively closed by other non-airtight sealable fasteners, such as, for example, a snap fastener, a hole and button fastener, a clamp fastener, a clip, a tie, and the like.

Figure 4:
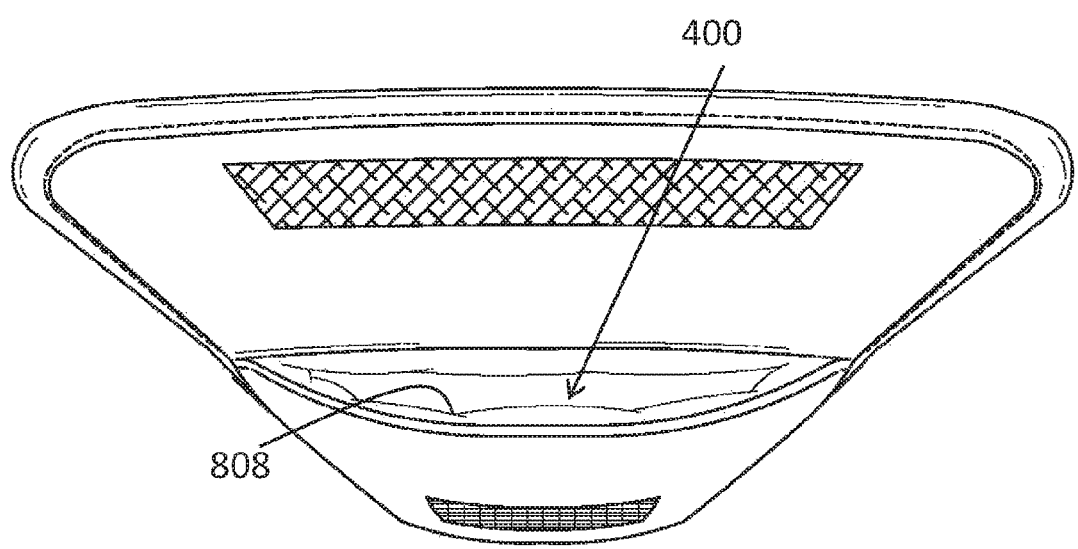
FIG. 4 is a downward-looking perspective view of the moisture removal pouch of FIG. 1, with the cover opened showing an electronic device receiving cavity, in accordance with the present invention.
Figure 5:
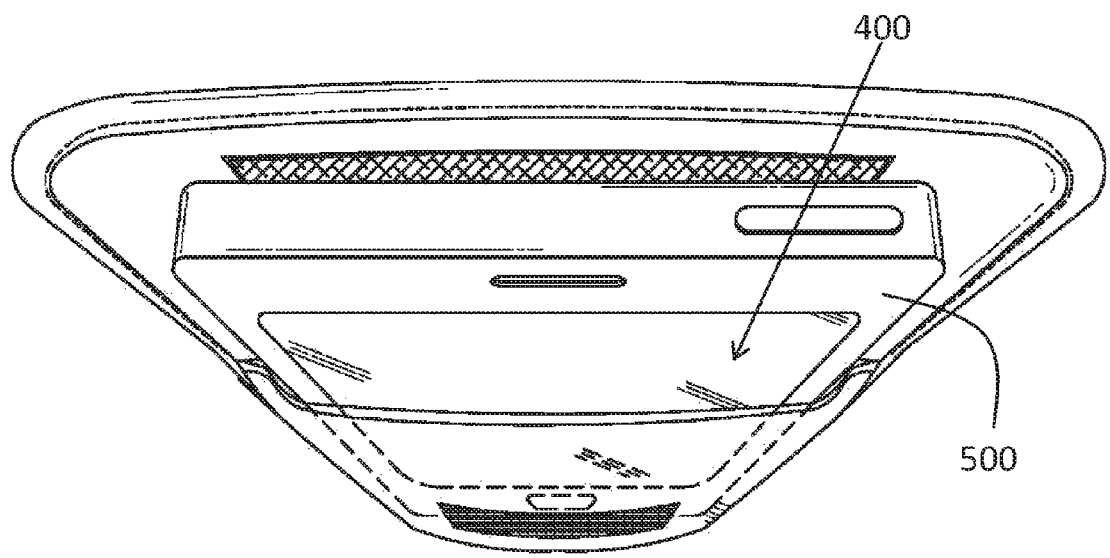
FIG. 5 is a downward-looking perspective view of the moisture removal pouch of FIG. 1, with the cover opened showing the electronic device partially inserted within the electronic device receiving cavity, in accordance with the present invention.

Referring now primarily to FIGS. 4 and 8, a bi-directional flow of moisture from the electronic device 500 to the desiccated silica 800, 802, 804, 806 will be described.

The main pouch body 102 includes a fluid-permeable inner liner 808 lining the electronic device receiving cavity 400. More specifically, the air-permeable inner liner 808 is disposed between the electronic device receiving cavity 400 and the desiccated silica 800, 802, 804, 806 so as to permit the bi-directional flow of moisture from the electronic device 500 disposed within the cavity 400 to the desiccated silica 800, 802, 804, 806. The bi-directional flow of moisture may include a first moisture removal channel (represented by arrow 810) flowing in a first direction 812 and a second moisture removal channel (represented by arrow 814) flowing in a second direction 816, opposite the first direction 812. The first moisture removal channel 810 may flow in the first direction 812, from the electronic device 500, through the air-permeable inner liner 808, to the desiccated silica 800, 802 permanently sealed within the front compartments 202 and 204. Simultaneously, the second moisture removal channel 814 may flow in the second direction 816, from the electronic device 500, through the fluid-permeable inner liner 808, to the desiccated silica 804, 806 permanently sealed within the rear compartments 302 and 304. Advantageously, the bi-directional, dual-channel moisture removal feature provides for a more quick and efficient removal of moisture than existing apparatuses and methods.

In one embodiment, the air-permeable inner liner 808 may be a continuous liner layer that extends continuously along both sides of the electronic device receiving cavity 400. In another embodiment, the air-permeable inner liner 808 may be a discontinuous liner layer, but should still be disposed on both sides of the electronic device receiving cavity 400 overlapping with the desiccated silica-filled compartments 202, 204, 302, and 304 so as to permit the flow of moisture therethrough from the electronic device 500.

In one embodiment, the air-permeable inner liner 808 may be made of a polyester fabric, such as, for example, a peach skin polyester lining. In a further embodiment, the air-permeable inner liner 808 may be made of a nylon material. In yet other embodiments, the air-permeable inner liner 808 may be made of other air-permeable materials and fabrics. In another embodiment, the air-permeable inner liner 808 allows moisture to pass through but does not itself absorb the moisture. In other embodiments, the air-permeable inner liner 808 may possess other properties.

Figure 10:
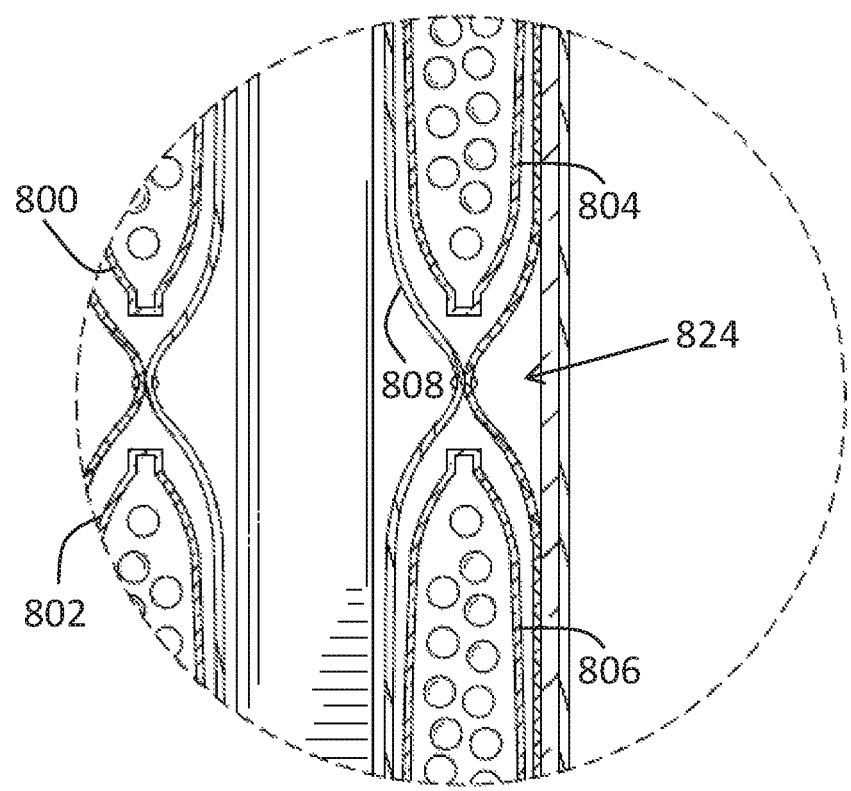
FIG. 10 is a close-up view of the area 10 depicted in FIG. 8.

With reference to FIGS. 8 and 10, each of the front panel portion 200 and the rear panel portion 300 may be considered multi-layered. In one embodiment, the front panel portion 200 may include as its layers, the air-permeable inner liner 808 as an interior layer, an exterior layer 818 that is of a non-permeable material, and the desiccated silica 800, 802 as an intermediate layer between the air-permeable inner liner 808 and the non-permeable exterior layer 818. Likewise, in one embodiment, the rear panel portion 300 may include as its layers, the fluid-permeable inner liner 808 as an interior layer, an exterior layer 820 that is of a non-permeable material, and the desiccated silica 804, 806 as an intermediate layer between the air-permeable inner liner 808 and the non-permeable exterior layer 820. The exterior layers 818, 820 may be considered the externally visible layers. Because the exterior layers 818, 820 are of a non-permeable material, in preferred embodiments, moisture from the external environment 218 is not able to pass through the exterior layers 818, 820 to saturate the desiccated silica 800, 802, 804, 806 embedded within the panel portions 200 and 300, which is preferably reserved for moisture from the electronic device 500 disposed within the pouch 100. FIG. 10 also depicts the two encapsulated compartments having the desiccated silica 800, 802, 804, 806.

In one embodiment, the exterior layers 818 and 820 may be of a nonwoven fabric. A nonwoven fabric is a fabric-like material that is typically made of long fibers, bonded together by chemical, mechanical, heat or solvent treatment, rather than by being woven together. In a further embodiment, the non-woven fabric may be known nonwoven fabrics, such as, for example, felt or a nonwoven polymer-based composite. In other embodiments, the exterior layers 818 and 820 may be made of other fabrics and materials.

In one embodiment, the front and rear panel portions 200 and 300 may also include a respective cushion layer 822 and 824, such as a sponge or soft foam material. The cushion layers 822 and 824 may be disposed between the exterior layers 818 and 820 and the desiccated silica-filled compartments 202, 204 and 302, 304, respectively. The cushion layer 822 and 824 may provide an additional moisture barrier to keep moisture from the external environment 218 from reaching the desiccated silica 800, 802, 804, 806 and may also provide a soft protective barrier to prevent damage to the electronic device 500 disposed within the moisture removal pouch 100.

Figure 9:
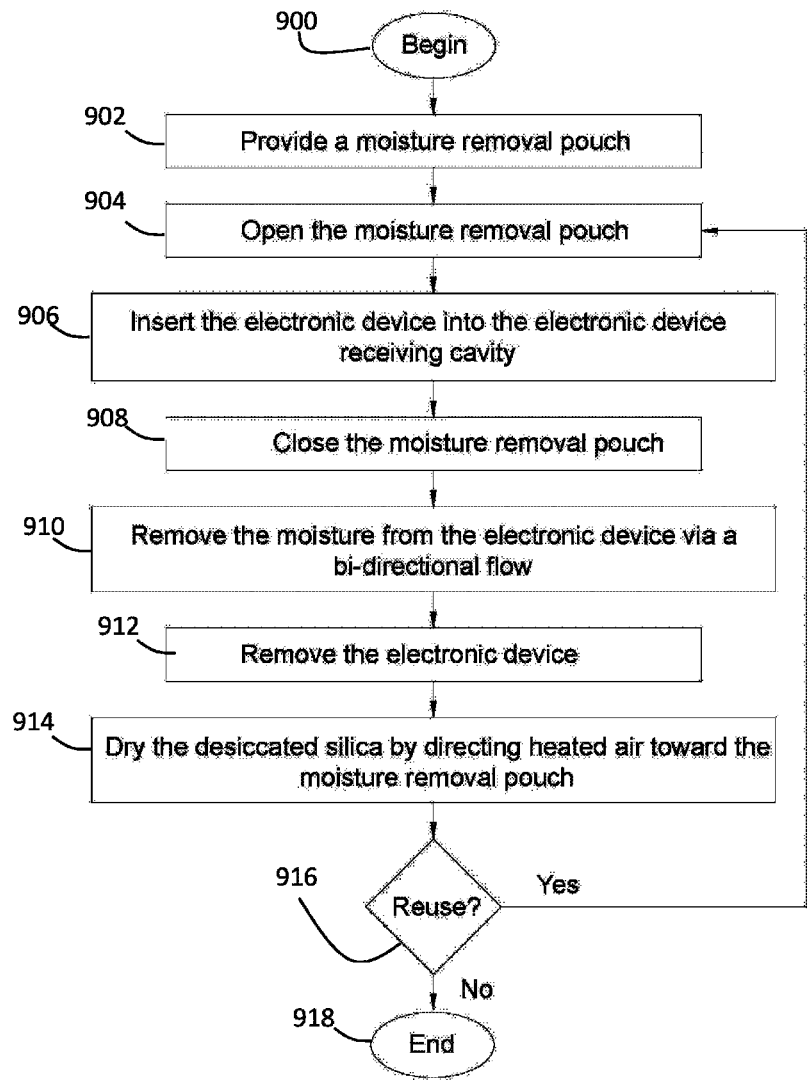
FIG. 9 is a process-flow diagram illustrating an exemplary method of removing moisture from an electronic device, in accordance with the present invention.

The inventive process will now be described with reference to the flow chart depicted in FIG. 9 in conjunction with FIGS. 1-8. Although FIG. 9 shows a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIG. 9 for the sake of brevity.

The process may begin at stop 900 and may immediately proceed to step 902, where the moisture removal pouch 100 is provided. In step 904, the moisture removal pouch 100 may be opened by lifting the pouch cover 104 to permit access into the electronic device receiving cavity 400 via the main pouch body opening 216. Step 904 may further include unfastening the fasteners 220 and 222, such as the hook-and-loop fasteners in order to lift the pouch cover 104 away from the main pouch body 102.

In step 906, after the moisture removal pouch 100 is opened in step 902, the user may insert the electronic device 500 through the main pouch body opening 216 into the electronic device receiving cavity 400. In a snug fit configuration of the main pouch body 102 step 906 may involve forcibly pushing the electronic device 500 into the electronic device receiving cavity 400. In other embodiments, the electronic device 500 may be simply dropped through the opening 216 and into the cavity 400.

In step 908, the user may close the moisture removal pouch 100 in the non-airtight sealable manner by moving the pouch cover 104 over the main pouch body opening 216. In one embodiment, the pouch cover 104 may be folded/bent over the main pouch body opening 216 and the fasteners 220 and 222 may be coupled together. In other words, the pouch cover 104 may be fastened to the main pouch body 102 via the fasteners 220 and 222.

In step 910, moisture is automatically removed from the electronic device 500 in the bi-directional flow of moisture from the electronic device 500 to the desiccated silica 800, 802, 804, 806, as discussed herein above. The user may wait for several hours to permit the moisture to be completely removed.

In step 912, after the moisture has been removed in step 908, the user may open the moisture removal pouch 100 by moving the pouch cover 104 away from the opening 216 and removing the electronic device 500 from within the cavity 400.

In step 914, the user may actively dry the desiccated silica 800, 802, 804, 806. In one embodiment, the user may dry the desiccated silica 800, 802, 804, 806 by directing heated air from an electronic drying device, such as a hair dryer, toward the moisture removal pouch 100. Specially, the heated air may cause the moisture within the desiccated silica 800, 802, 804, 806 to evaporate. In one embodiment, the pouch cover 104 may be laid open during step 914 so as to permit the moisture vapors to escape into the external environment 218. The heated air may be directed toward the desiccated silica 800, 802, 804, 806 for many minutes, until the desiccated silica 800, 802, 804, 806 is dry.

In step 916, the user queries whether the moisture removal pouch 100 is desired by the user to be reused to remove moisture from an electronic device 500, either the same electronic device 500 or another. If the answer is "yes," e.g., the electronic device 500 gets wet again, the process moves to step 904 and repeats. If the answer is "no," e.g., the electronic device 500 does not become wet again, the process ends at step 918.

A novel and efficient re-usable moisture removal pouch and method of using the same to remove moisture from an electronic device has been disclosed. Embodiments of the invention provide a main pouch body with front and rear panel portions permanently sealed together at bottom and side edges thereof so as to define a pouch cavity and a pouch opening into the pouch cavity opposite the bottom edge. In addition, embodiments of the invention provide for desiccated silica compartments embedded into the front and rear panel portions for bi-directional removal of moisture from both sides of the electronic device simultaneously. Some embodiments of the invention provide for the pouch cavity to be sized and shaped so as to provide a snug fit for a standard-sized smart phone so that moisture travels more readily to the desiccated silica compartments embedded into the front and rear panel portions, rather than escaping into the outside environment through the pouch opening.

Further, embodiments of the invention divide the front and rear desiccated silica compartments into respective top and bottom desiccated silica compartments. In an additional embodiment, the pouch cavity is lined with a permeable inner liner and the exterior layer of the main pouch body is of a non-permeable material. In yet a further embodiment, the moisture removal pouch includes a pouch cover that may be folded over the pouch opening so as to selectively cover the pouch opening in a non-airtight manner during a moisture removal operational configuration. Unexpectedly, such an embodiment provides for a convenient, user-friendly method and apparatus for opening and closing the pouch for continued re-usability, while also still effectively and efficiently removing moisture from the electronic device disposed within the pouch cavity.

What is claimed is:

1. A moisture removal pouch comprising:
   a main pouch body:
     having a front panel portion with at least one front compartment embedded within the front panel portion and with desiccated silica permanently sealed within the at least one front compartment on all sides thereof;
     having a rear panel portion with at least one rear compartment embedded within the rear panel portion and with desiccated silica permanently sealed within the at least one rear compartment on all sides thereof, the rear panel portion disposed opposite the front panel portion and the at least one front compartment disposed opposite the at least one rear compartment;
     the front and rear panel portions permanently sealed together at a bottom edge and side edges thereof so as to define an electronic device receiving cavity and a permanent main pouch body opening opposite the bottom edge, the electronic device receiving cavity sized to receive a standard-sized smart phone therein with a snug fit and the main pouch body opening sized to receive the standard-sized smart phone into the electronic device receiving cavity;
     having a fluid-permeable inner liner disposed to permit a bi-directional flow of moisture from the standard-sized smart phone disposed within the electronic device receiving cavity, the bi-directional flow of moisture including a first moisture removal channel flowing in a first direction, from the standard-sized smart phone, through the air-permeable inner liner, to the desiccated silica permanently sealed within the at least one front compartment and simultaneously, a second moisture removal channel flowing in a second direction, opposite the first direction, from the standard-sized smart phone, through the air-permeable inner liner, to the desiccated silica permanently sealed within the at least one rear compartment; and
   being closed in a non-airtight sealable manner.

2. The moisture removal pouch in accordance with claim 1, further comprising:
   a pouch cover disposed to cover the main pouch body opening in the non-airtight sealable manner.

3. The moisture removal pouch in accordance with claim 2, wherein:
   the pouch cover is formed as a selectively closeable flap.

4. The moisture removal pouch in accordance with claim 3, wherein:
   the flap is selectively closeable by a hook-and-loop fastener.

5. The moisture removal pouch in accordance with claim 1, wherein:
   the at least one front compartment includes at least two vertically aligned front compartments each with desiccated silica permanently sealed therein; and
   the at least one rear compartment includes at least two vertically aligned compartments each with desiccated silica permanently sealed therein.

6. The moisture removal pouch in accordance with claim 1, wherein:
   each of the front and rear panel portions are multi-layered with the air-permeable inner liner as an interior layer, a non-permeable material as an exterior layer, and the corresponding desiccated silica as an intermediate layer disposed between the air-permeable inner liner and the non-permeable material.

7. The moisture removal pouch in accordance with claim 1, wherein:
   the air-permeable inner liner is of a polyester fabric; and
   exterior layers of the front and rear panel portions are of a nonwoven fabric.

8. The moisture removal pouch in accordance with claim 1, wherein:
   the front and rear panel portions are stitched together at the side and bottom edges.

9. A moisture removal pouch comprising:
   a main pouch body having:
     a front panel portion with at least one front compartment embedded within the front panel portion and with desiccated silica permanently sealed within the at least one front compartment on all sides thereof;
     a rear panel portion with at least one rear compartment embedded within the rear panel portion and with desiccated silica permanently sealed within the at least one rear compartment on all sides thereof, the rear panel portion disposed opposite the front panel portion and the at least one front compartment disposed opposite the at least one rear compartment
     the front and rear panel portions permanently sealed together at a bottom edge and side edges thereof so as to define an electronic device receiving cavity and a permanent main pouch body opening opposite the bottom edge, the main pouch body opening sized to receive an electronic device into the electronic device receiving cavity;
     an air-permeable inner liner lining the electronic device receiving cavity so as to permit a bi-directional flow of moisture on an electronic device disposed within the electronic device receiving cavity, the bi-directional flow of moisture including a first moisture removal channel flowing in a first direction, from the electronic device, through the air-permeable inner liner, to the desiccated silica permanently sealed within the at least one front compartment and simultaneously, a second moisture removal channel flowing in a second direction, opposite the first direction, from the electronic device, through the air-permeable inner liner, to the desiccated silica permanently sealed within the at least one rear compartment; and a moisture removal operational configuration in which the main pouch body opening is closed in a non-airtight sealable manner.

10. The moisture removal pouch in accordance with claim 9, further comprising:

a pouch cover disposed to selectively cover the main pouch body opening in the non-airtight sealable manner.

11. The moisture removal pouch in accordance with claim 10, wherein:

the pouch cover is formed as a selectively closeable flap.

12. The moisture removal pouch in accordance with claim 11, wherein:

the flap is selectively closeable by a hook-and-loop fastener.

13. The moisture removal pouch in accordance with claim 9, wherein:

the at least one front compartment includes two vertically aligned front compartments each with desiccated silica permanently sealed therein; and the at least one rear compartment includes two vertically aligned rear compartments each with desiccated silica permanently sealed therein.

14. The moisture removal pouch in accordance with claim 9, wherein:

each of the front and rear panel portions are multi-layered with the air-permeable inner liner as an interior layer, a non-permeable material as an exterior layer, and the corresponding desiccated silica as an intermediate layer disposed between the air-permeable inner liner and the non-permeable material.

15. The moisture removal pouch in accordance with claim 9, wherein:

the air-permeable inner liner is of a polyester fabric; and exterior layers of the front and rear panel portions are of a nonwoven fabric.

16. The moisture removal pouch in accordance with claim 9, wherein:

the front and rear panel portions are stitched together at the side and bottom edges.

17. A method of removing moisture from an electronic device comprising:

providing a moisture removal pouch with:

a main pouch body:

having a front panel portion with at least one front compartment embedded within the front panel portion and with desiccated silica permanently sealed within the at least one front compartment on all sides thereof;

having a rear panel portion with at least one rear compartment embedded within the rear panel portion and with desiccated silica permanently sealed within the at least one rear compartment on all sides thereof, the rear panel portion opposite the front panel portion;

the front and rear panel portions permanently sealed together at a bottom edge and side edges thereof so as to define an electronic device receiving cavity and a main pouch body opening sized to receive an electronic device into the electronic device receiving cavity; and having an air-permeable inner liner lining the electronic device receiving cavity; and being closed in a non-airtight sealable manner, and a pouch cover disposed to selectively cover the main pouch body opening in the non-airtight sealable manner;

opening the moisture removal pouch by lifting the pouch cover to permit access into the electronic device receiving cavity;

after opening, inserting an electronic device through the main pouch body opening into the electronic device receiving cavity to remove moisture from the electronic device;

after inserting, closing the moisture removal pouch in the non-airtight sealable manner by moving the pouch cover over the main pouch body opening;

after removing moisture, removing the electronic device from the electronic device receiving cavity and drying the desiccated silica by directing heated air from a hair dryer toward the moisture removal pouch; and after drying the desiccated silica with the hair dryer, reusing the moisture removal pouch to remove moisture from a second electronic device.

18. The method in accordance with claim 17, further comprising:

removing moisture from the electronic device disposed within the electronic device receiving cavity via a bi-directional flow of moisture including a first moisture removal channel flowing in a first direction, from the electronic device, through the air-permeable inner liner, to the desiccated silica permanently sealed within the at least one front compartment and simultaneously, a second moisture removal channel flowing in a second direction, opposite the first direction, from the electronic device, through the air-permeable inner liner, to the desiccated silica permanently sealed within the at least one rear compartment.

19. The method in accordance with claim 17, wherein the step of closing the moisture removal pouch further comprises:

fastening the pouch cover to the main pouch body via a hook-and-loop fastener.

* * * * *